US008944533B2

(12) United States Patent
Hofmann et al.

(10) Patent No.: US 8,944,533 B2
(45) Date of Patent: Feb. 3, 2015

(54) RACK

(75) Inventors: Wilfried Hofmann, Munich (DE); Simon Jocham, Munich (DE); Igor Harry Schaaf, Rheinmuenster (DE); Paul Mazura, Karlsbad (DE); Manfred Hellwig, Bad Homburg V. D. Hoehe (DE); Walter Nicolai, Buseck (DE)

(73) Assignee: C E S Control Enclosure Systems GmbH, Bad Homburg V.d. Hoehe (DE)

( * ) Notice: Subject to any disclaimer, the term of this patent is extended or adjusted under 35 U.S.C. 154(b) by 0 days.

(21) Appl. No.: 13/819,762

(22) PCT Filed: Aug. 26, 2011

(86) PCT No.: PCT/EP2011/004288
§ 371 (c)(1),
(2), (4) Date: Apr. 18, 2013

(87) PCT Pub. No.: WO2012/031697
PCT Pub. Date: Mar. 15, 2012

(65) Prior Publication Data
US 2013/0213908 A1    Aug. 22, 2013

(30) Foreign Application Priority Data
Aug. 30, 2010    (DE) .......................... 10 2010 035 789

(51) Int. Cl.
*A47G 29/00*    (2006.01)
*H02B 1/01*    (2006.01)
(52) U.S. Cl.
CPC    *H02B 1/01* (2013.01); *H02B 1/013* (2013.01); *H02B 1/014* (2013.01); *H02B 1/012* (2013.01)
USPC .................................................... 312/265.1
(58) Field of Classification Search
CPC .......... H02B 1/014; H02B 1/01; H02B 1/301; H02B 1/30; H02B 1/013; H02B 1/012; H05K 7/183; A47B 47/0008; F16B 2012/446

USPC .......... 312/265.1–265.4, 223.3, 333.4, 223.2; 211/26, 189, 182, 175, 191, 192; 403/170, 171, 172, 176
See application file for complete search history.

(56) References Cited

U.S. PATENT DOCUMENTS 436,149 A * 9/1890 Overgaard ................... 217/12 R
1,631,718 A * 6/1927 Campbell ..................... 312/140
(Continued)

FOREIGN PATENT DOCUMENTS

DE    33 44 598 C1    9/1984
DE    196 47 814 C2    6/1999
(Continued)

OTHER PUBLICATIONS

International Search Report issued in corresponding application No. PCT/EP2011/004288 mailed Apr. 11, 2012.

*Primary Examiner* — Joshua Rodden
*Assistant Examiner* — Hiwot Tefera
(74) *Attorney, Agent, or Firm* — Carter, DeLuca, Farrell & Schmidt, LLP

(57)    ABSTRACT

A rack is presented including a plurality of at least first and second frame pieces adapted to be interconnected, wherein each frame extends along a longitudinal axis. The rack includes a corner connector arranged to interconnect at least the first frame piece and the second frame piece with the longitudinal axes of the first and second interconnected frame pieces arranged obliquely to one another. The rack includes at least first and second bracing units in which, for the purpose of connecting a plurality of frame pieces, the first bracing unit is capable of bracing the first frame piece against the corner connector arranged between the first and second frame pieces to be connected, and the second bracing unit is capable of bracing the second frame piece against the corner connector obliquely to the first frame piece. Each bracing unit includes at least one tensioning element and two force transmission members.

15 Claims, 5 Drawing Sheets

(56) References Cited

U.S. PATENT DOCUMENTS

| | | | | |
|---|---|---|---|---|
| 3,462,181 | A | * | 8/1969 | Lewis .......................... 52/586.1 |
| 3,835,354 | A | * | 9/1974 | Torres-Pena ................ 312/265.4 |
| 3,864,049 | A | * | 2/1975 | Ono .............................. 403/171 |
| 3,890,022 | A | * | 6/1975 | Moon ............................ 312/140 |
| 4,126,364 | A | * | 11/1978 | Reilly ........................... 312/140 |
| 4,735,527 | A | * | 4/1988 | Bullivant ..................... 405/232 |
| 4,954,007 | A | * | 9/1990 | Pinney .......................... 403/172 |
| 4,997,240 | A | * | 3/1991 | Schmalzl et al. .......... 312/265.4 |
| 5,430,989 | A | * | 7/1995 | Jones ........................... 52/655.1 |
| 5,525,005 | A | * | 6/1996 | Chen ............................ 403/374.4 |
| 5,722,477 | A | * | 3/1998 | Richter et al. ............... 160/135 |
| 5,899,545 | A | * | 5/1999 | Besserer et al. ........... 312/257.1 |
| 5,932,843 | A | * | 8/1999 | Besserer et al. ................ 174/50 |
| 5,984,566 | A | * | 11/1999 | Blaha ........................... 403/364 |
| 6,047,838 | A | * | 4/2000 | Rindoks et al. ............... 211/187 |
| 6,062,664 | A | * | 5/2000 | Benner ...................... 312/265.1 |
| 6,223,917 | B1 | * | 5/2001 | Bruder .......................... 211/189 |
| 6,550,880 | B2 | * | 4/2003 | Reuter ....................... 312/265.3 |
| 7,086,707 | B2 | * | 8/2006 | Wyatt et al. ................ 312/265.4 |
| 7,850,021 | B2 | * | 12/2010 | Yang et al. ..................... 211/182 |
| 8,297,450 | B2 | * | 10/2012 | Zavidniak et al. ............ 211/13.1 |
| 2006/0119239 | A1 | * | 6/2006 | Werwick .................. 312/334.29 |
| 2010/0314982 | A1 | * | 12/2010 | Luo ............................ 312/351.1 |

FOREIGN PATENT DOCUMENTS

| | | |
|---|---|---|
| DE | 196 47 753 C2 | 9/2000 |
| WO | 95/11537 A1 | 4/1995 |
| WO | 2007/082962 A2 | 7/2007 |

* cited by examiner

RACK

The present invention relates to a rack, particularly a rack which constitutes a frame for a switch cabinet, comprising a plurality of frame pieces that can be interconnected, wherein each frame piece is constructed as a cylindrical hollow profile and extends along a longitudinal axis, and wherein the longitudinal axes of two interconnected frame pieces are arranged obliquely to one another. Here, the term "rack" is intended to mean supporting structures such as are used, for example, in furniture construction and, in particular, shelving construction, but also other supporting structures, for instance base frames for machines, supporting frames for enclosures, etc.

The switch cabinets already mentioned generally serve to accommodate electrical and electronic components of a processing installation, a machine tool, a production facility, etc., which are not located directly in or on the machine (e.g. sensors). Different requirements are imposed upon the switch cabinet, depending upon the nature of the components to be installed. Thus it may be necessary, with regard to the components to be installed in the interior space, for the switch cabinet to protect them against dust and water (type of protection, IP protection classes according to DIN EN 60529), against overheating (air-conditioning of the switch cabinet), against electromagnetic interference (EMC) and/or against mechanical influences, vandalism and earthquakes (cabinets with extra struts). Furthermore, a switch cabinet may be used for mounting and structuring the internal setup (e.g. with the aid of carrying rails or mounting plates for subdivision into output and control areas).

In addition, however, the switch cabinet also makes it possible to protect the external environment, for example by offering screening of electromagnetic emissions from the components installed, protection against dangerous voltages (protection classes; protective earthing or protective insulation) and/or, if necessary, fire protection (special solutions for smoke extraction installations).

In principle, switch cabinets are usually made up of a frame rack and of wall and door elements that can be attached to the latter. Depending upon the desired use and the requirements resulting therefrom which are imposed upon the switch cabinet, the frame rack and the elements that can be attached to it may be manufactured from different materials and/or with different coatings. For the frame rack, use is normally made of frame pieces which are constructed as cylindrical hollow profiles. In this connection, the term "cylindrical" is not limited to cylinders with a circular cross-section, but also includes, according to the mathematical definition of a cylinder, bodies with other cross-sectional shapes.

The longitudinal axis of a frame piece may be its central longitudinal axis or any longitudinal axis extending parallel thereto. In this connection, the arrangement of the longitudinal axes of two interconnected frame pieces obliquely to one another includes any conceivable arrangement in which the longitudinal axes are not arranged parallel to one another. In practice, the interconnected frame pieces mostly form a right angle between them.

Frame racks of this kind for a switch cabinet are known, in principle, from the prior art, for example from DE 43 36 188 C2. This patent specification discloses a switch cabinet comprising a frame rack which is assembled from frame pieces. There are formed, first of all, two base frames which cannot be dismantled and which are assembled, in a first design variant, from the horizontal frame pieces at the floor end (which form the lower base frame) and also from the horizontal frame pieces at the ceiling end (which form the upper base frame). These two base frames can be interconnected in a detachable manner via frame pieces that extend vertically. Alternatively, in a second design variant consisting of two vertical and two horizontal frame pieces in each case, a front and a rear lateral frame, which frames cannot be dismantled, may be formed and can then be interconnected in a detachable manner via upper and lower horizontal frame pieces. The detachable connection may, for example, take place with the aid of fastening screws or the like at the point of assembly, while the two base or lateral frames are, in practice, usually produced by welding together the frame components that constitute them.

However a mode of construction of this kind gives rise to a number of disadvantages. Thus, the base or lateral frames which cannot be dismantled need more space for storage and dispatch purposes than individual frame pieces. Because of the size of the base or lateral frames, moreover, handling in the course of assembly at the point of use also turns out to be more difficult, under certain circumstances, than would be the case with individual frame pieces.

The provision of a weld seam between the frame components to be interconnected may also be disadvantageous for a number of reasons. Thus it is a known fact that, in the case of welding, material-bonding is achieved between the elements to be connected, through the fact that the material of the elements to be connected is intensively heated up by the local introduction of heat in order to bring said material to melting point in the region of the weld seam. This can result in thermal distortion of the elements that are welded to one another.

The consequence of this, in the case of the frame pieces, is that additional after-treatment steps are necessary in order to align the frame pieces again and bring them into the desired position relative to one another. This is particularly the case if the frame pieces are welded to so-called "corner connectors" such as, for example, in the arrangements which are known from DE 196 47 753 C2 and DE 196 47 814 C2, since the corner connectors have, as a rule, a greater wall thickness in the area of connection than the hollow profiles of the frame pieces.

A further disadvantage may emerge when such a frame rack is used for a switch cabinet which is intended to provide for screening of the electromagnetic emissions of the installed components towards the outside, and protection of said installed components from electromagnetic interference (EMC). For such an application of the switch cabinet, the structural components are normally provided with a special coating which is intended to improve the electrical conductivity of said switch cabinet and thus guarantee optimal earthing of the latter.

Furthermore, depending upon the choice of materials for the structural components of the switch cabinet, it may be necessary to coat the individual structural components in order to avoid corrosion. In this case, too, the structural components are often provided with a suitable coating (e.g. with a non-metallic coating such as plastic or a metallic coating such as zinc), even before they are connected to form a switch cabinet.

The welding process for connecting the frame pieces gives rise to an erosion by burning in the region of the weld seam that destroys the coating of the frame pieces locally and may thus impair the desired electrical conductivity and/or the corrosion resistance of said frame pieces. Furthermore, some coatings may have an adverse effect upon the welding process, so that it is necessary to refrain from coating, before the welding process, the structural components to be connected.

The only possibility that remains, for the purpose of avoiding corrosion or ensuring improved conductivity of the frame pieces, is to apply, or repair, a suitable coating after the welding process, something which involves additional costs and an increased outlay, in terms of time, in the course of production and assembly.

Last but not least, mention should be made, as disadvantages of welding, of the high energy requirement and the cost-intensive working protection measures for the welding personnel.

In order to lessen the abovementioned disadvantages, it is also known, from practical experience, to screw the frame pieces to corner connectors at the corners instead of welding them, as is disclosed, for example, in DE 33 44 598 C1. As practical experience has shown, however, it is necessary, in the case of this design variant, to additionally make the frame rack stiffer against, and more secure from, distortion by installing extra transverse struts having at least two rail-type sides that stand perpendicularly to one another, in order to interconnect mutually opposed horizontal or vertical frame pieces belonging to the frame rack. This is particularly necessary if the switch cabinet is to be moved with the aid of a crane when in use. For this purpose, eyes for hooks, which can be used for receiving snap-hooks or the like, may be attached, for example, to the corners of the corner connectors at the ceiling end. The tractive force emanating from a crane is introduced, via such eyes for hooks, into the frame rack of the switch cabinet, where it can lead to bending or distortion of the vertical frame pieces. Although the provision of extra transverse struts may solve this problem, it nevertheless means, once again, additional outlay, in terms of time and cost, in the course of production and assembly.

Finally, a corner connection device for making up a housing frame, in which device a first frame profile is connected to a second frame profile in a corner region of the frame rack by means of a locking device, is known from DE 202 0 813 U1. For this purpose, the first profile has, on one longitudinal side, an aperture in the region of the corner connection, which aperture extends from the outside to the inside of the profile and in which there can be inserted a projection on the second profile which is constructed on the end face of the latter. The projection on the second profile has, in turn, a recess in which a bracing sleeve can be inserted, from the inner side of the first profile, as a locking device for interconnecting the two profiles. This prevents the possibility of the second profile being extracted, with its projection, from the aperture and from the interior space of the first profile.

Even in this form of embodiment, however, the problem can arise of the switch cabinet having insufficient stiffness against distortion if moved by means of a crane, so that it may possibly be necessary to provide additional elements in order to guarantee adequate stability of the rack.

The aim that has been set for the present invention is to make available a rack which, on the one hand, can be dismantled as completely as possible in order to permit simple and cost-effective storage and delivery, and which, on the other hand, leads to improved stability of the rack when in the assembled condition.

This object is achieved, while adopting a rack having the features initially described as the starting point, through the fact that said rack further comprises at least one bracing unit which, for the purpose of connecting a plurality of frame pieces, is capable of bracing a first frame piece against at least one second frame piece or against at least one corner connector arranged between the frame pieces to be connected, wherein the bracing unit comprises at least one separately constructed tensioning element which extends substantially over the entire length of the first of the frame pieces to be connected, and also two force transmission members which are associated with the tensioning element and which transmit a tensioning force of the tensioning element, which force acts in the direction of the longitudinal axis of the first frame piece to be braced, to the structural components of the rack which are to be braced against each other, so that the tensioning force braces the first frame piece against the at least one second frame piece and/or against the at least one corner connector.

In other words, the effect of the bracing unit is that at least two frame pieces can be interconnected in a detachable manner through the fact that one frame piece is drawn by the tensioning element in the direction of the longitudinal axis of the other frame piece. In this connection, different arrangements are conceivably possible, depending upon the design of the rack, namely a first arrangement in which at least two frame pieces are directly braced against one another, and a second variant in which two or more frame pieces are interconnected via a corner connector arranged between them. In the case of the first variant, it is obviously also possible to brace more than two frame pieces, for example three, four or five frame pieces, against one another. In the case of the second arrangement variant, the frame pieces are braced against the corner connector. Both design variants can be combined with one another if necessary, i.e. one frame piece is braced, at its first free end, against a corner connector, while it may be braced against at least one second frame piece by its second free end.

The tensioning element extends substantially over the entire length of the first frame piece, i.e. said tensioning element may, for example, have exactly the same length as the associated frame piece. Alternatively, however, it may also be appropriate for the tensioning element to extend approximately over the length of the first frame piece in order to come into engagement, for example by means of its force transmission members, with the structural components to be braced. It is also conceivably possible, with a suitable design of the force transmission members, for the tensioning element to extend over the majority of the length of the first frame piece, but to be of slightly shorter construction than the associated frame piece. In the case of this design variant, the force transmission members extend, at the end, into the frame piece in order to interact with the tensioning element and to be able to transmit the tensioning force of the latter to the structural components of the rack which are to be braced.

Through the fact that the tensioning element extends substantially over the entire length of the first of the frame pieces to be connected, it is possible for a tractive force, such as emanates from a crane, for example, and is introduced into the switch cabinet, to be absorbed by the tensioning element, as a result of which the hollow profile of the first frame piece is relieved of load. Furthermore, the solution according to the invention, with a bracing unit for connecting a plurality of frame pieces, offers a solution in which it is possible to dispense with a welded connection, so that the disadvantages which have been described above in this connection do not occur in the case of the rack according to the invention.

The bracing force or tensioning force which braces at least two structural components of the rack against one another may be based on different physical effects, depending upon the design of the bracing unit. Thus, for example, the tensioning force may be the result of an elastic restoring force or of a clamping force which is usual in screw connections.

In one particular form of embodiment, the bracing unit may be intended, or be suitable, for interconnecting three frame pieces. In this design variant, for example, the first frame piece is arranged between the second and a third frame piece or their longitudinal axes, and the bracing unit is constructed in such a way that a tensioning force of the tensioning element that is effective in the direction of the longitudinal axis of the first frame piece is transmitted, by associated force transmission members, to the second and third frame pieces, so that these are braced, in each case, against the first frame piece.

In one form of embodiment, in which a first frame piece is braced against at least one second frame piece, the force transmission members of the tensioning element are each supported on the frame pieces to be braced. In an arrangement in which more than two structural components of the rack are to be braced to one another, the force transmission members which are associated with a tensioning element are each supported on the structural components at the end, i.e. on those structural components which have only one face of abutment on another structural component which is to be braced with the aid of the tensioning element. If the tensioning force of the tensioning element is transmitted by the force transmission members to the structural components which are arranged at the end in each case, said components are moved, as a result of the tensioning force, in the effective direction along the longitudinal axis L of the frame element with which the tensioning element is associated, until the structural components to be braced touch one another and thus build up a force that counteracts the tensioning force. In this way, a connection between the structural components is achieved by the bracing of two or more structural components. It is also possible to undo the connection between the structural components by loosening the tensioning force.

The at least one tensioning element of the bracing unit may, as will be explained in greater detail below, be designed as a rigid tensioning element such as, for example, a bar, a bolt or the like. Alternatively, it may also be a flexible tensioning element such as, for example, a tensioning cable, tensioning belt or the like. In addition, the tensioning element may be of elastic construction along the longitudinal axis of the frame piece, at least in certain sections, or be capable of being connected to elastic elements of the bracing unit. In this context, "elastic" is understood to mean the property of being capable of deforming elastically under the action of external forces and, when the forces that are acting are discontinued, of tending to return, because of an elastic restoring force, to the original shape (such as is the case, for example, with a spring element). In a form of embodiment of this kind, the tensioning force of the tensioning element or of the elements of the bracing unit is produced by the elastic restoring force.

However, the bracing unit need not have any elastic elements. Instead, the tensioning force which braces, against one another, the structural components to be braced, may be produced, for example, through the fact that the bracing length of the tensioning element, i.e. the distance between the force transmission members, is reduced, so that the structural components on which the force transmission members are supported are moved towards one another and are braced against one another.

The force transmission members, or at least one of said force transmission members, may be separate elements and have a supporting section, for support on one of the structural components of the rack which are to be braced, and also an engaging section by which the force transmission member can be brought into engagement with the tensioning element for force transmission purposes. Said supporting section may, for example, comprise a supporting face, such as the end face of a screw nut or the like, which is suitable, by supporting the force transmission member on one of the structural components to be braced, for transmitting the tensioning force of the tensioning element to the said component.

The engaging section may likewise be constructed in a different manner, for example as threads, latching hooks, latching noses or the like, which engage in suitable (corresponding) projections, recesses or the like constructed on the tensioning element, and are capable or interacting with these. Thus, the engaging section of a force transmission member and the associated tensioning element may be brought into engagement with one another, for example by insertion, latching-in, engagement, screwing-in or screwing-on and the like.

The engaging section of a force transmission member may also, alternatively, be formed as a hook or a recess with which the tensioning element, for example in the form of a flexible tensioning element, can be brought into engagement. Furthermore, it is also conceivably possible, for example, for a connection between the tensioning element and the force transmission member to be constructed for single use and to be designed so as to be capable of being undone by the destruction of the tensioning element, for instance in a manner similar to the principle on which plastic cable ties function. Preference is given, however, to a non-destructive releasable connection between tensioning element and engaging section, for example by the provision of corresponding threads on said tensioning element and said engaging section of the force transmission member.

Instead of a separate construction of the force transmission members, however, it is also conceivably possible for one or both of the force transmission members associated with a tensioning element to be constructed in one piece with the latter. In this variant, the force transmission members each have a supporting section for support on one of the structural components of the rack which are to be braced, but no engaging section, like the force transmission members which are constructed separately. The variant comprising a force transmission member which is constructed integrally with the associated tensioning element is particularly favourable in conjunction with an elastic tensioning element or a flexible tensioning element. Thus, for example, the tensioning element may be constructed as a tension spring or the like which has, at one or both end sections, engaging hooks or the like for support on the structural components to be braced. It is alternatively possible, when the tensioning element is configured as a tensioning belt or tensioning cable, for said tensioning element to also be fastened by means of a knot or the like to one of the structural components to be braced, in order to thus achieve force-transmitting support. Again, another solution may make provision for a flexible tensioning element to be passed through a through-bore or the like on one of the structural components to be braced, and to be prevented by a knot or the like from passing out of the through-bore in a direction of extraction.

In another alternative, at least one of the force transmission members may be constructed integrally on a structural component of the rack, for example a corner connector, which is to be braced. Although, in this design variant, the force transmission member has an engaging section by which it can be brought into engagement with the tensioning element for force transmission purposes, it nevertheless has no supporting section for support purposes, since this can be dispensed with because of the integral construction with the structural component to be braced.

The tensioning element may also comprise a bar which is provided with a thread, at least in the region of one of its end sections. In this form of embodiment, the force transmission members may comprise an internal or external thread which corresponds with the thread of the tensioning element. Thus, for example, the bar may have an external thread, at least on one of its end sections, and one of the associated force transmission members may have a corresponding internal thread, so that the force transmission member can be screwed onto the bar at the end. In the reverse case, the bar may comprise, at one end, a recess at the end face with an internal thread into which a force transmission member can be screwed by means of a corresponding external thread.

As already explained, however, it is equally possible, in the case of a force transmission member which is constructed in an integral manner, for a suitable internal or external thread that corresponds with the thread of the tensioning element to be provided on one of the structural components of the rack which are to be braced.

The frame profile of a frame piece may also be constructed in such a way that it has, at the ends, end faces of which at least one extends substantially perpendicularly or transversely to the longitudinal axis of the frame piece. In this case, the outer edges of the superficies of the hollow profile delimit the end faces. Under these circumstances, the delimiting outer edges do not have to lie in one plane, but may also have depressions or projections. Thus, for example, it may be favourable, in a form of embodiment in which the frame pieces are directly interconnected and the first frame piece abuts, with its end face, against the superficies of the second frame piece, for the abutting end face to be constructed in a manner complementary to the abutment face on the superficies of the other frame piece.

In one alternative form of embodiment, provision may be made for the frame pieces to abut against each other at their end faces without any corner connectors arranged between them, and to be interconnected. In a form of embodiment of this kind, the end faces may each extend obliquely to the longitudinal side of the frame piece, for example at an angle of 45° to said longitudinal side, so that the frame pieces which abut against one another at the ends and are interconnected form a right angle between them. It is also conceivably possible, in a special design of the end faces, to brace more than two, for example three, four or five frame pieces, which abut against one another at the ends without any corner connectors arranged between them, against one another by means of a bracing unit and to interconnect them in this way.

According to the invention, the corner connectors may have at least one through-opening for receiving the tensioning element of a first of the frame pieces that are to be connected. Depending upon the configuration, the corner connector may also have a plurality of through-openings for receiving a plurality of tensioning elements belonging to the frame pieces that are to be braced. In a first form of embodiment, the through-opening in the corner connector serves exclusively to pass a tensioning element through, at least with its end section. Alternatively, the through-opening may also be constructed with an internal thread or the like, under which circumstances the said thread assumes the function of an engaging section of the force transmission member which, in this form of embodiment, is constructed integrally with the corner connector.

In this form of embodiment, the connection of a first frame piece to a corner connector may be effected, for example, through the fact that the tensioning element of the first frame piece is passed through the through-opening of the corner connector and is brought into engagement with a separately formed force transmission member on that side of the through-opening which faces away from the first frame piece. In this way, an extracting movement of the tensioning element from the through-opening towards the first frame piece is prevented and it is possible to exert a tensioning force which braces said first frame piece against the corner connector. The same effect can be obtained with a force transmission member which is constructed on the corner connector in an integral manner.

The hollow profiles of the frame pieces of a rack advantageously have an identical cross-section and comprise a lead-through, which is constructed on the hollow profile, for the tensioning element. In this case, the said lead-through may be constructed inside the hollow profile or extend outside the latter. In both cases, the lead-through may be a part of the hollow profile itself.

In principle, the cavity formed inside the hollow profile may also be used as the lead-through. However, it may be appropriate, in order, for example, to achieve improved guidance and relative orientation of the tensioning element to the hollow profile by means of the lead-through, to construct the latter in a special way. In this case, it is favourable if the internal diameter of the lead-through approximately corresponds to the external diameter of the tensioning element, i.e. is not substantially greater than the external diameter of the latter.

Moreover, the hollow profile of a frame piece may be brought into a cylindrical profile shape by forming a substantially flat, plate-like starting material, said hollow profile having, on two opposite lateral edges, a connecting region for closing the hollow profile, which connecting region at the same time comprises the lead-through which is formed by at least two receiving flaps, at least one of which is provided on each of the two lateral edges.

The substantially flat starting material of the hollow profile may, for example, be a sheet-metal blank which can be brought into the cylindrical profile shape in a simple manner by bending. The material chosen in this connection may be any bendable material, for example metals, metal-containing materials or a fiber composite. The lead-through for the tensioning element is provided in the connecting region of the hollow profile, said tensioning element being passed, within the lead-through, through the at least two receiving flaps which each extend outwards from one of the lateral edges of the hollow profile.

The receiving flaps form, together with the tensioning element which is received in them, a positive-locking arrangement which is suitable for keeping the lateral edges of the frame piece hollow profile in connection with one another for the purpose of closing them. It is therefore possible, if this is desired, to dispense with the application of an ordinary welding process for closing the hollow profile by material-bonding, so that, even during the manufacture of the hollow profiles for the frame pieces, the disadvantages associated therewith are eliminated.

The receiving flaps may be arranged so as to be offset in relation to one another along the longitudinal axis of the frame piece. In this case, a distance may be provided between them in the direction of said longitudinal axis. Alternatively, however, they may also be arranged in a manner directly following one another.

The receiving flaps in question may be closed or open receiving regions, i.e. the receiving flaps may be constructed, for example, so as to be sleeve-shaped, hook-shaped and the like. What is critical is that a lead-through, through which the tensioning element of the bracing unit can extend, is formed with the aid of the receiving flaps.

The receiving flaps of the lateral edges may also be formed, in each case, by a flap-shaped projection which protrudes from the particular lateral edge and is brought into a hook-like or sleeve-like shape by forming.

Furthermore, the corner connector may be constructed for the purpose of interconnecting at least two frame pieces, and preferably three frame pieces, under which circumstances it comprises at least one abutment face for each of the frame pieces to be connected. The at least two frame pieces to be connected are able to abut against, and be supported on, said corner connector. A corner connector of this kind is typically constructed in such a way that it is capable of interconnecting three frame pieces which are located perpendicularly to one another pair-wise in each case. In one design variant, the abutment faces of the corner connector may accordingly be arranged perpendicularly to one another, and the frame pieces may abut against the perpendicular abutment faces via their end faces. In this form of embodiment, the end faces of the frame pieces are constructed substantially perpendicularly to the longitudinal axis, a fact which permits simple production of said frame pieces.

Alternatively, however, the abutment faces may also, depending upon the design of the end faces of the frame pieces, be arranged at a different angle to one another which allows the frame pieces which are interconnected via a corner connector to be orientated at a predetermined angle to one another. It is also conceivably possible to bring the frame pieces into abutment with an abutment face on the corner connector via a lateral abutment face on their hollow profile.

In order to permit simpler assembly and to guarantee that the corner connector fits flush, via its abutment faces, against the end faces of the frame pieces to be connected, said corner connector may have, on each abutment face, at least one projection and/or at least one recess that corresponds with the profile cross-section of the hollow profile of the particular frame piece to be connected, and is capable of orientating said frame piece when the latter is in the connected condition. This results in the advantage that the hollow profiles are additionally stabilised in the region of their connection to the corner connectors, since they abut laterally against corresponding contact faces on the projections or recesss on the corner connector.

Thus, for example, it is conceivably possible for a projection to protrude from each abutment face of the corner connector in a direction in which the particular hollow profile of the frame piece is supposed to extend when in the connected condition. Said projection corresponds with the profile cross-section of that hollow profile of the frame piece which is to be connected, in such a way that said hollow profile can be, for example, slipped onto said projection, the inner peripheral face of the hollow profile then coming into abutment against the outer peripheral face of the projection.

Alternatively, however, a recess, which may, for example, be groove-shaped, may also be constructed on the respective abutment faces, into which recess an end section of that hollow profile of a frame piece which is to be connected can be inserted. In this case, the path of the groove likewise corresponds to the profile cross-section. The width of the groove may be chosen in such a way that it is not smaller than the wall thickness of the hollow profile. Alternatively, however, the groove-shaped recess may also be slightly smaller than the wall thickness of the hollow profile, for example for a desired press fit of said hollow profile within said groove-shaped recess.

The recess on the abutment face need not be constructed in a groove-shaped manner as a circumferential groove that corresponds to the profile cross-section of the hollow profile, but may be a laminar recess, the outer contour of which substantially corresponds to the outer contour of said profile cross-section of the hollow profile. Whereas, in the solution involving a groove, the hollow profile connected comes into abutment with the contact faces of the groove-shaped recess on both the inside and the outside, contact can only be made on the outside in the case of a laminar recess.

Combinations of a projection with a recess are obviously likewise conceivably possible.

The corner connector may also comprise at least two separately constructed parts which can be interconnected in a detachable manner. Since very high bending forces and bending moments can act upon the corner connector if the switch cabinet is tilted, it is advisable to design it to be as robust as possible. In practice, this is normally achieved through the fact that the corner connector is manufactured as a comparatively solid body, for example as a one-piece die-cast part or the like. However, this has a disadvantageous effect on the weight of the switch cabinet, since parts of this kind have a comparatively high weight.

On the other hand, it is possible, according to the invention, to design the at least two separate parts of the corner connector in such a way that they jointly enclose a cavity and are interconnected in a detachable manner. In this way, a corner connector can be made available which, on the one hand, has a high degree of robustness and, on the other hand, permits a saving in weight. In addition, it is possible, for example, for the end sections of the tensioning elements of the respective connected frame pieces and, if necessary, their force transmission members, to be received, if desired, in the cavity which is enclosed by the at least two parts of the corner connector.

Connection of the two parts of the corner connector may be achieved, for example, by means of a screw or the like, which can be inserted in, and screwed into, corresponding apertures on said two parts of the corner connector.

Alternatively, however, it is also possible, if the tensioning elements are designed in a suitable manner, to use at least one of said tensioning elements for connecting the at least two parts of the corner connector. Under these circumstances, the at least two parts of the corner connector may be interconnected in a detachable manner with the aid of the bracing unit of one of the frame pieces to be connected, the parts of the corner connector which are to be connected having receiving apertures, which are in alignment with one another, for the at least one tensioning element.

Preferred embodiments of the invention will be explained below with the aid of the appended diagrammatic drawings, in which.

Figure 1:
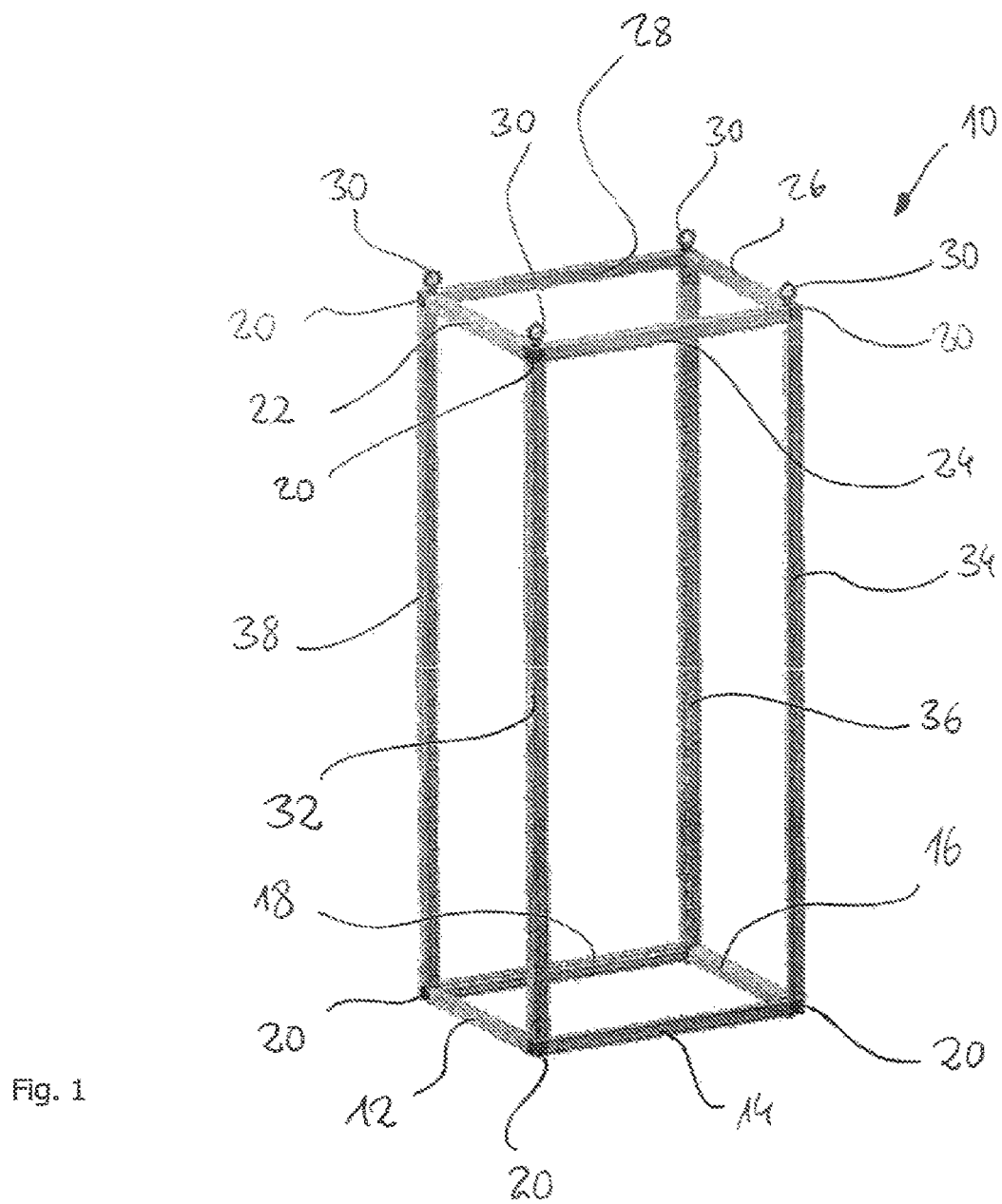
FIG. 1 shows an isometric representation of a rack according to the invention in the form of a switch cabinet frame rack.

A switch cabinet frame rack according to the invention, which as a whole is designated with the reference symbol 10, is shown diagrammatically in FIG. 1. In the form of embodiment shown, the switch cabinet frame rack 10 comprises four lower horizontal frame pieces 12, 14, 16, 18 which form a rectangle, and four upper horizontal frame pieces 22, 24, 26, 28, which also form a rectangle, and also four vertical frame pieces 32, 34, 36, 38 which connect the two rectangles. The frame pieces are interconnected in the corner regions of the switch cabinet frame rack by so-called "corner connectors" 20, each pair of interconnected frame pieces forming a right angle between them in the embodiment shown. All the frame pieces, without exception, are formed from cylindrical hollow profiles 42 which will be described again in greater detail below and which extend along a longitudinal axis L (cf. FIGS. 2 and 3).

Figure 5:
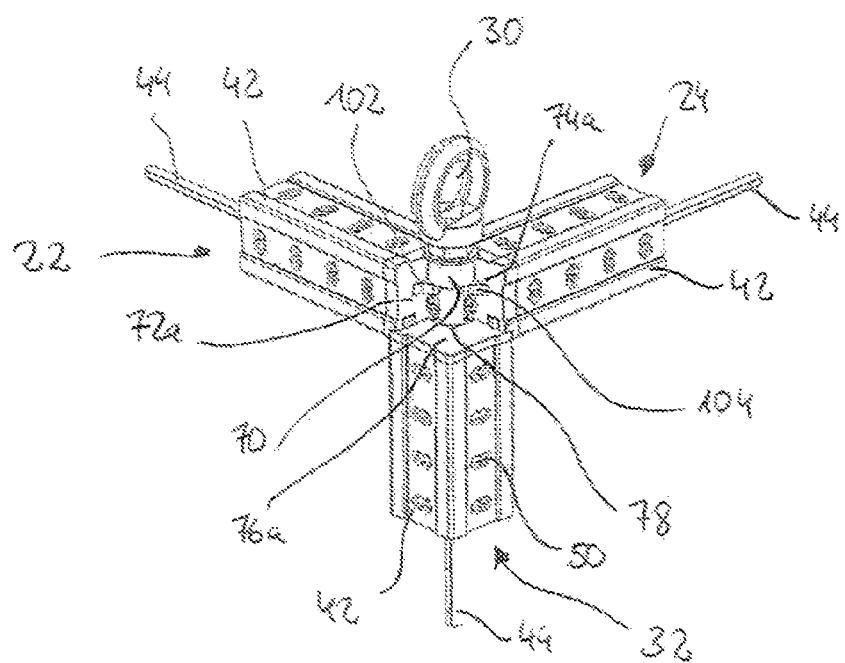
FIG. 5 shows a detail view of the switch cabinet frame rack according to the invention in accordance with FIG. 1, in a second form of embodiment.

There may be additionally attached to the upper corner connectors 20 crane eyes 30 or the like which make it possible to lift and move the switch cabinet frame rack 10, or even the fully assembled switch cabinet, with the aid of a crane (cf. FIG. 5).

Figure 2:
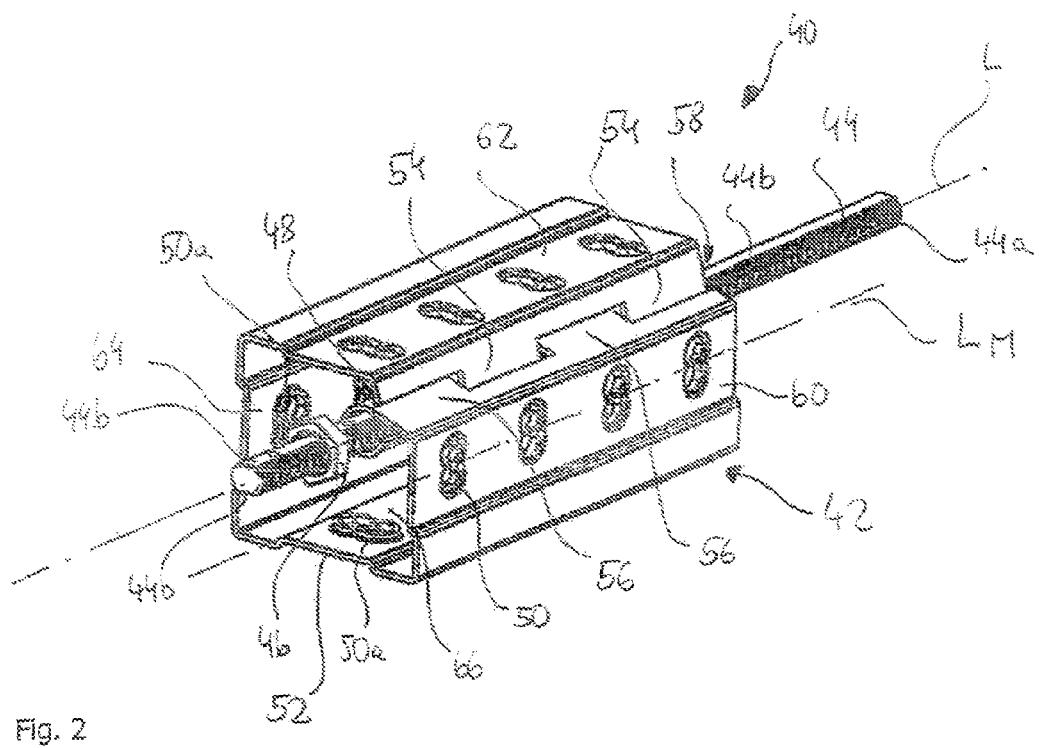
FIG. 2 shows an isometric view of a bracing unit for connecting the frame pieces of a rack according to the invention in accordance with FIG. 1.

The interconnection of the individual frame pieces via the corner connectors takes place by means of bracing units 40, the essential structural components of which are represented on an exemplary basis in FIG. 2. Here, a hollow profile 42 belonging to one of the frame pieces of the switch cabinet frame rack 10 is braced against a corner connector 20 by means of a tensioning element 44 and two force transmission members 46 and, in this way, is connected to other frame pieces via the corner connector 20.

In the form of embodiment represented in FIG. 2, the tensioning element 44 is constructed as a threaded bar which carries an external thread 44a on its outer periphery. In addition, it has two flattened sections 44b which are arranged in an opposed manner and are devoid of a thread. As an alternative to the form of embodiment represented in FIG. 2, however, other design shapes are also conceivably possible such as, for example, an embodiment with a bar which carries an external thread only on its two end sections, a design in the form of a bar which has, in the region of its ends, an internal bore which extends into the bar from the end faces and has an internal thread, or even a design of the tensioning element in the form of a flexible belt, a traction cable or the like.

The force transmission member 46 may, as shown in FIG. 2, have a nut with a corresponding internal thread which makes it possible to screw said force transmission member onto the tensioning element. Alternatively, however, the force transmission member may also be constructed as a tensioning screw which is screwed into an internal thread on the bar, as a clip which has latching hooks or the like and which can be connected to a tensioning belt or tensioning cable, etc.

Figure 4:
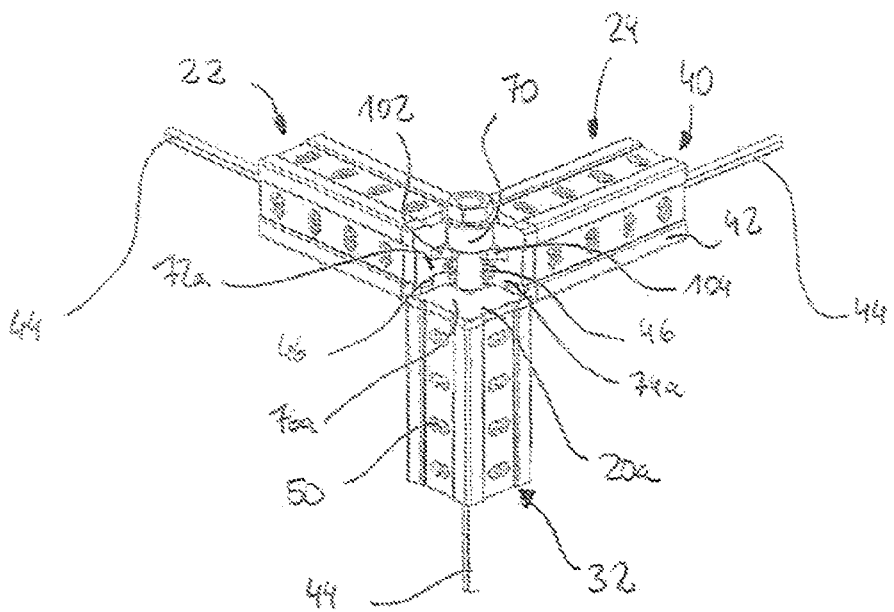
FIG. 4 shows a detail view of the switch cabinet frame rack according to the invention in accordance with FIG. 1, in a first form of embodiment.

The tensioning element 44, which is constructed as a threaded bar, extends along the longitudinal axis L of the hollow profile 42 substantially over the entire length of an associated frame piece, i.e. a little way beyond it as can be seen in FIGS. 4 and 5, and connects at least two frame pieces by bracing both the first frame piece and the second frame piece against a common corner connector 20. Alternatively, two frame pieces may also be braced directly to one another by means of a bracing unit. In both cases there is produced, with the aid of the tensioning element 44, a tensioning force which is effective in the direction of the longitudinal axis L of the associated frame piece and is transmitted, by the two force transmission members 46, to the structural components to be braced. In the case of a force transmission member 46 constructed as a screw nut, the internal thread forms an engaging section by means of which the nut engages in the external thread 44a of the tensioning element 44. Furthermore, that end face by means of which the screw nut abuts against a structural component which is to be braced forms a supporting section via which said screw nut is supported on said structural component to be braced and, in this way, is able to transmit to the abutting structural component a tensioning force of the tensioning element 44 that is effective in the longitudinal direction L.

Figure 3:
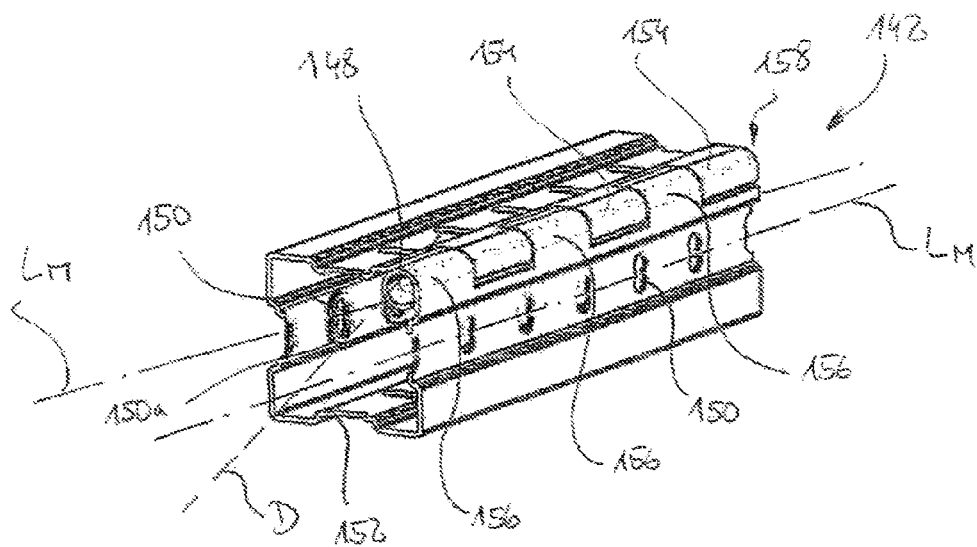
FIG. 3 shows an isometric view of a hollow profile of a frame piece, in one possible form of embodiment.

FIGS. 2 and 3 show two different configurations of a hollow profile, 42 and 142 respectively, belonging to a frame piece. Each of the two hollow profiles has a lead-through 48, 148 for the tensioning element 44, which lead-through permits guided reception of the tensioning element 44 inside the hollow profile 42, 142. In this case, the lead-through 48, 148 is formed by a plurality of sleeve-shaped receiving flaps which are in alignment with one another.

In the manufacture of a hollow profile for a frame piece, a substantially flat starting material, e.g. a sheet-metal blank, is brought by forming, for example bending, into a cylindrical profile shape which is to subsequently form the closed hollow profile. In this case, the cylindrical profile shape may have, for example, a profile shape like the substantially five-cornered one shown in FIG. 2 or the substantially four-cornered one shown in FIG. 3, in which two opposed, substantially parallel lateral edges meet in a connecting region, 58 and 158 respectively. In the region of the lateral edges in each case there are provided a plurality of flap-shaped projections, 54, 56 and 154, 156 respectively, which form the receiving flaps. These are arranged along the longitudinal axis L with an offset in relation to one another in such a way that a projection, 54 and 154 respectively, on a first lateral edge engages, in each case, in the intervening space between two projections, 56 and 156 respectively, of the second lateral edge, or vice versa. In addition, the flap-shaped projections are likewise formed, for example by bending, so that they provide the sleeve-shaped receiving flaps which are arranged so as to be in alignment with one another in a direction of connection of the hollow profile.

The sleeve-shaped receiving flaps, which are formed by the projections, 54, 56 and 154, 156 respectively, may, as in the forms of embodiment shown, merge into the lateral faces, 60, 62 and 160, 162 respectively, of the hollow profile in the connecting region, 58 and 158 respectively, in a smooth or flush manner, i.e. without a bend or break. Alternatively, however, said flaps may also have a bend or offset in the transitional region and protrude into the interior of the hollow profile or towards the outside.

In the forms of embodiment of the frame pieces which are shown, the lateral edges of the hollow profile 142 can be detached from one another in the connecting region 158 under the action of a suitable external force, so long as no tensioning element is inserted in the lead-through 148. If, however, a tensioning element 44, such as the threaded bar in FIG. 2 for example, is received in the lead-through 48, this fixes the projections 54, 56 in their position relative to one another, so that the lateral edges are kept connected and the hollow profile 42 remains closed.

In this way, the tensioning element 44 fulfils two functions namely, on the one hand, that of bracing the frame pieces to be interconnected against the corner connectors with the aid of force transmission members and thus connecting them, and, on the other hand, that of keeping the hollow profile, through which the tensioning element extends, closed. In addition, the tensioning element may, depending upon its configuration, stabilise the hollow profile, for example if the tensioning element in question is a rigid tensioning element 44 such as a threaded bar with suitable stiffness and resistance to bending. Even a flexible tensioning element, such as a tensioning cable, tensioning belt or the like, may be suitable for stabilising the hollow profile, since it may likewise counteract bending of said hollow profile if kept under tension. Finally, the tensioning elements which are interconnected via the corner connectors form a network of force transmission lines which stabilises the switch cabinet as a whole in the event of external tractive forces being introduced, e.g. by a crane.

All the frame pieces of the switch cabinet frame rack 10 preferably have an identical profile cross-section, as a result of which manufacturing costs can be reduced, since the individual frame pieces only have to be cut to length from a profile strand of a pre-shaped hollow profile in a manner corresponding to the desired length. Furthermore, the hollow profile of a frame piece may be constructed, viewed in cross-section, so as to be symmetrical to a diagonal D that extends through the profile cross-section and intersects the longitudinal axis L. This symmetrical property of the hollow profiles ensures that there is no upper or lower section of the hollow profiles that has been stipulated in advance with respect to the installation situation, a fact which considerably simplifies the assembly of the switch cabinet frame rack.

In addition, those lateral faces of the hollow profile which are parallel to one another (i.e. the lateral faces 60 and 64, as well as 62 and 66 in FIG. 2) have a number of fastening receptacles, 50 and 150 respectively, which are constructed as overlapping double holes in the shape of an eight. The fastening receptacles 50, 150 serve to receive fastening means with the aid of which internal fittings can be inserted in the switch cabinet frame rack. In the case of this special embodiment of the receptacles 50 as a double hole, two eccentric fastening receptacles, which are symmetrical in relation to the central longitudinal axis $L_M$, are attached to each of the mutually parallel lateral faces of the hollow profile 42, 142 instead of a single fastening receptacle which is arranged in an axially symmetrical manner with respect to a central longitudinal axis $L_M$ of the corresponding lateral face. These fastening receptacles may, as shown in the figures, intersect with, or be arranged at a distance from, one another.

The symmetry of the fastening receptacles in relation to the central longitudinal axis $L_M$ ensures that there is no upper or lower section of the hollow profiles that has been stipulated in advance with respect to the installation situation of the internal fittings that are to be inserted in the switch cabinet frame rack.

The hollow profiles are brought into their desired shape by a forming process, for example by bending or stamping and pressing, the fastening receptacles 50, 150 having a reinforcing collar 50a, 150a that protrudes into the interior of the hollow profile. Furthermore, the fastening receptacles 50, 150 in the forms of embodiment shown in FIGS. 2 and 3 are constructed on a lateral face or channel-like depression 52, 152 belonging to the respective sides 60, 62, 64 and 66 which is recessed in relation to the outer periphery of the hollow profile 42, 142. This channel-like depression 52, 152 in the lateral faces, which is likewise produced by bending, further contributes to the stiffening of the hollow profile 42, 142.

Figure 6A:
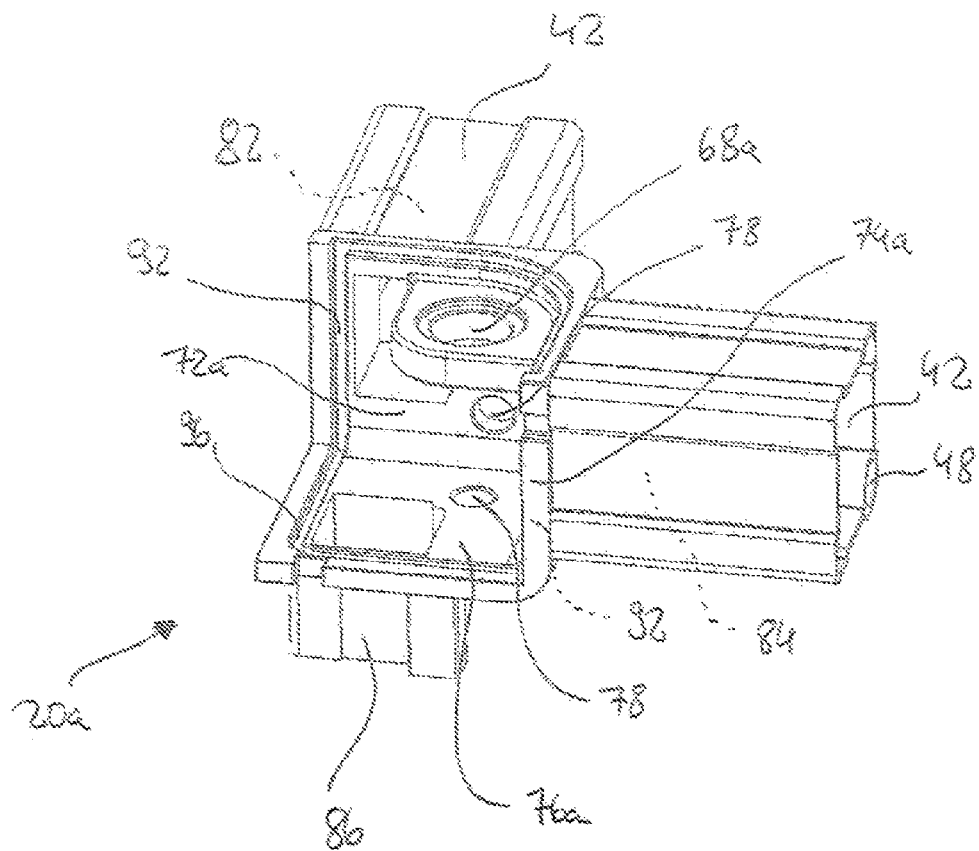
FIGS. 6a-c show isometric views of the parts of a corner connector belonging to the switch cabinet frame rack according to the invention.

FIGS. 4 and 5 show how three frame pieces 22, 24 and 32 are connected by means of a corner connector 20 and three bracing units 40 which are associated with said frame pieces. The corner connector 20, of which only a first part 20a is shown in FIGS. 4 and 5, has three wall sections 72a, 74a and 76a with external abutment faces against which the frame pieces 22, 24 and 32 to be connected abut at their end faces. In addition, the corner connector may have, on each of its abutment faces on the wall sections 72a, 74a and 76a, a projection 82, 84 and 86 (cf. FIG. 6a) or the like which extends towards the frame piece to be connected and onto which the hollow profile 42 of said frame piece to be connected can be slipped (represented in FIG. 6a are hollow profile sections 42 which are slipped onto the projections 82 and 84).

Furthermore, the corner connector 20 has through-bores 78 which are constructed in the region of each wall section 72a, 74a, 76a and through which the tensioning elements 44 of the respective frame pieces 22, 24, 32 may extend. The through-bores 78 may extend through the projections 82, 84 and 86. Alternatively, said projections may be arranged with an offset in relation to the through-bores.

A force transmission member 46 can then be brought, from a side of the particular wall section that lies opposite the frame piece, into engagement with the tensioning element 44 which extends through the through-bore 78, said force transmission member having a greater external diameter than said through-bore 78. In the case of a tensioning element 44 which is constructed as a threaded bar, the force transmission member 46 may, as has already been explained with reference to FIG. 2, be a screw nut which is screwed onto the external thread 44a of the threaded bar. With the aid of the screw nut 46, extraction of the threaded bar 44 through the through-bore 78 is prevented, so that the tensioning element 44 is secured at one end. The same is achieved, likewise with a separate force transmission member (mirror-image form of embodiment) or with an integrally constructed force transmission member on another corner connector or frame piece, at the other end, in each case, of the frame pieces which are to be connected.

In a mirror-image form of embodiment, therefore, there are arranged between two force transmission members in each case, a frame piece and also two corner connectors with a wall section, which are braced against one another through the fact that the effective bracing length of the tensioning element is shortened, for example by a screwing movement of the force transmission members towards one another.

However, this effect can also be achieved with other combinations of a tensioning element and a force transmission member. Thus, for example, a tensioning element constructed as a tensioning belt, tensioning cable or the like may be fastened directly (e.g. by means of a knot) to the structural component to be braced, such as the corner connector, or to the force transmission member. Furthermore, the tensioning element may be, at least partially, of rigid construction and may have, for example, projections (latching noses) which interact with corresponding latching noses or a suitably shaped receptacle in such a way that passing-through is possible only in one direction (the cable tie principle).

Figure 6B:
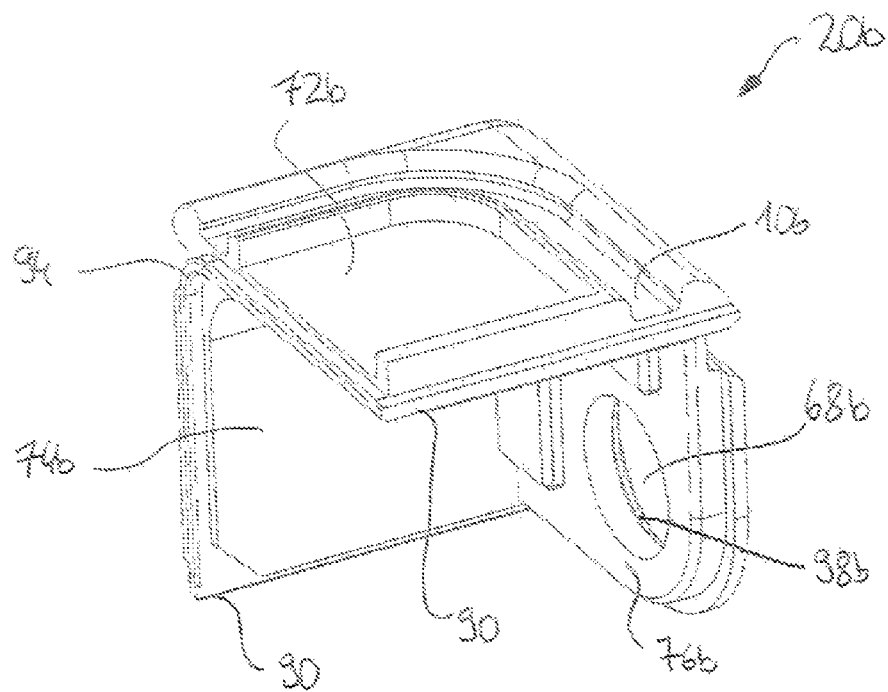

As has already been indicated above, the corner connector 20 is of two-part construction in this case (cf. FIGS. 6a and 6b). The second part 20b of the corner connector 20 substantially corresponds, in its form of construction, to the first part 20a, with three wall sections 72b, 74b, 76b which are substantially perpendicular to one another. In the assembled condition, the wall sections 72a, 74a and 76a of the first part 20a and the wall sections 72b, 74b, 76b of the second part 20b delimit a parallelepipedal inner cavity. On the outer lateral faces of the wall sections 72b, 74b, 76b, however, the second part 20b has no projections for connection to frame pieces. Instead, there may be arranged, at least on one outer lateral face (cf. FIG. 6b, wall section 72b), a groove 106 which is open towards the outside and which, in the assembled condition, is in alignment with corresponding receiving grooves on the frame pieces connected, and may serve to receive a sealing element.

A separate tensioning screw or the like may be used in order to interconnect the two parts 20a and 20b of the corner connector 20. However, it may also be particularly advantageous, as shown in FIGS. 4 and 5, for one of the tensioning elements to be used, with an associated force transmission member, for this purpose. In this form of embodiment, a force transmission member 70 of special construction (cf. also FIG.

Figure 6C:
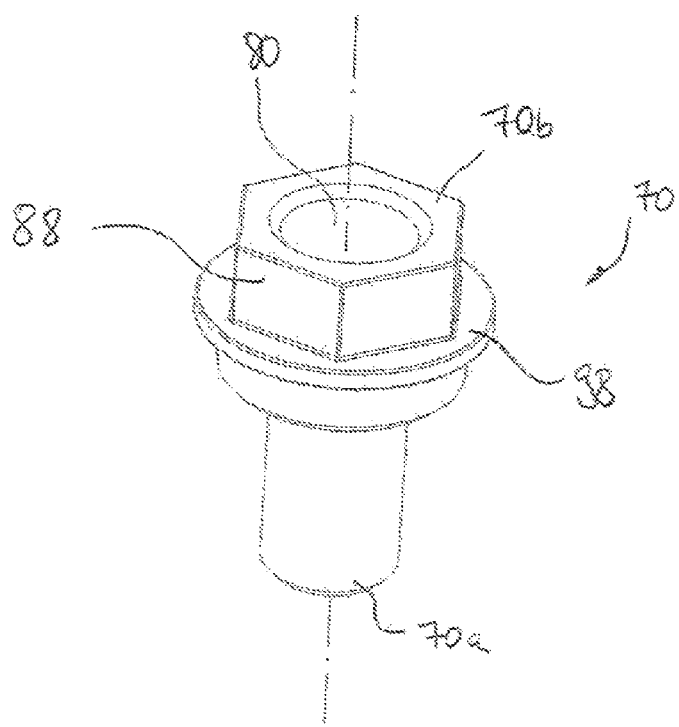

6c) may be screwed onto the external thread 44a of the threaded bar 44 from outside. For this purpose, the second part 20b of the corner connector 20 has, on one lateral face 76b, a fastening aperture 68b which is in alignment with the through-bore 78 in the first part 20a. Through this aperture, the bolt-shaped force transmission member 70 is put onto the threaded bar 44 and has, at a first end 70a, an internal bore (not represented) with an internal thread that can be screwed onto the threaded bar 44. At its opposite end 70b, the force transmission member 70 possesses at least one screw head 88 (usually constructed as an external hexagon) with a collar 98. In addition, there may also be constructed on the opposite, second end 70b of the force transmission member 70, as shown in FIG. 6c, a bore which likewise has an internal thread and which thus makes it possible for a crane eye 30, for example, to be screwed into said bore. In order to simplify the manufacture of the force transmission member 70, both the bores may be constructed as a through-bore 80 with an internal thread (not represented).

The screw head 88 is shaped in such a way that a technician with a suitable tool can rotate the force transmission member 70 in the desired direction until the collar 98 comes into abutment against the abutment face 76b or a depression 98b surrounding the fastening aperture 68b, and in this way braces the first part 20a to the second part 20b.

The assembly of the switch cabinet frame rack will be described in an exemplary manner below with the aid of a corner connector 20 and with reference to the figures: In a first step, the frame pieces 22, 24 and 32 are slipped onto the projections 82, 84, 86 of the corner connector 20 in such a way that the lead-through 48 of each frame piece is in alignment with one of the through-bores 78 on the corner connector 20 in each case. The threaded bar 44 of each frame piece is then introduced into the lead-through 48 of the hollow profile 42 sufficiently far for a free end of the threaded bar 44 to extend through the respective through-bore 78 in the corner connector 20 onto the opposite side of the respective wall section.

In a further step, the nuts 46 are screwed onto the free ends of the respective threaded bars 44 of the frame pieces 22 and 24, so that the threaded bars 44 can no longer be pulled through the through-bores 78 towards the projection onto which the frame piece 22, 24 is slipped. As soon as both the force transmission members associated with a tensioning element are in engagement with the latter and are supported on the structural components to be braced, the tensioning force can be adapted by adjusting the depth of screwing.

The second part 20b of the corner connector 20 is then connected to the first part 20a. For this purpose, said second part 20b is inserted, via its guiding edges 90, in corresponding guide rails 92 and is pushed sufficiently far into the first part 20a for its guiding edge 94 to engage in the guide rail 96 of the first part 20a. In this position, the aperture 68b is in alignment with the through-bore 78 through which the threaded bar 44 of the frame piece 32 extends.

For the purpose of stabilising the wall section 76b of the second part 20b, the first part 20a of the corner connector 20 is provided, as shown in FIG. 6a, with a supporting face 100 which has a corresponding fastening aperture 68a which is likewise in alignment with the fastening aperture 68b in the second part 20b. An alternative design is shown in FIGS. 4 and 5, in which supporting noses 102, 104 protrude from the inner faces of the wall sections 72a, 74a towards the cavity formed by the parts 20a, 20b of the corner connector 20.

The force transmission member 70 (cf. also FIG. 6c) is now screwed onto the external thread 44a of the threaded bar 44 from outside towards the frame piece 32 sufficiently far for the collar 98 to come into abutment against the abutment face 76b or a depression surrounding the fastening aperture 68b, and in this way braces the first part 20a of the corner connector 20 against the second part 20b, and the frame piece 32 to said corner connector 20, at one end.

A crane eye 30 may additionally be screwed into the internal bore 80 in the screw head 88.

What is claimed is:

1. A rack, comprising:
    at least first and second frame pieces adapted to be interconnected, wherein each frame piece extends along a longitudinal axis;
    a corner connector arranged to interconnect at least the first frame piece and the second frame piece with the longitudinal axes of the first and second interconnected frame pieces arranged obliquely to one another; and
    the first frame piece having a first bracing unit and the second frame piece having a second bracing unit in which, for the purpose of connecting a plurality of frame pieces, the first bracing unit is capable of bracing the first frame piece against the corner connector arranged between the first and second frame pieces to be connected, and the second bracing unit is capable of bracing the second frame piece against the corner connector obliquely to the first frame piece, each bracing unit including:
    a hollow profile having first and second opposite lateral edges, a first receiving flap defined on the first lateral edge, and a second receiving flap defined on the second lateral edge, wherein the first and second receiving flaps are axially aligned with each other, thereby defining a lead-through;
    at least one tensioning element formed as a separate member from the hollow profile and disposed through the lead-through; and
    two force transmission members which are associated with the tensioning element and which transmit a tensioning force of the tensioning element, which force is effective in a direction of the longitudinal axis of the first frame piece to be braced, to structural components of the rack which are to be braced to each other, so that the tensioning force braces the first frame piece against the at least one second frame piece or against the at least one corner connector,
    wherein each tensioning element extends axially, substantially over an entire length of the associated first or second frame piece.

2. The rack according to claim 1, wherein at least one of the force transmission members is formed as a separate member and has a supporting section, for support on one structural component of the structural components of the rack which is to be braced, and an engaging section such that the force transmission member can be brought into engagement with the tensioning element for force transmission purposes.

3. The rack according to claim 1, wherein at least one of the force transmission members is constructed integrally on one structural component of the structural components of the rack, which is to be braced.

4. The rack according to claim 1, wherein the tensioning element comprises a bar which is provided with a thread, at least in a region of one of its end sections.

5. The rack according to claim 4, wherein the force transmission members comprise an internal or external thread which corresponds with the thread of the tensioning element.

6. The rack according to claim 1, wherein the corner connector has at least one through-opening for receiving the tensioning element of at least the first frame piece to be connected.

7. The rack according to claim 1, wherein each of the hollow profiles have an identical cross-section.

8. The rack according to claim 1, wherein the hollow profile of a frame piece is brought into a closed profile shape by forming a substantially flat starting material, said hollow profile having a connecting region on the two opposite lateral edges for closing the hollow profile, which connecting region includes the lead-through.

9. The rack according to claim 1, wherein each of the receiving flaps provided on the lateral edges is formed by a flap-shaped projection which extends from a particular lateral edge and is brought into a hook-like or sleeve-like shape.

10. The rack according to claim 1, wherein the corner connector is configured for interconnecting at least two frame pieces, the corner connector having at least one abutment face for each of the frame pieces to be connected.

11. The rack according to claim 10, wherein the corner connector has, on each abutment face, at least one projection or at least one recess, which projection or recess corresponds with a profile cross-section of the hollow profile of the particular frame piece to be connected, and is capable of orientating the particular frame piece, relative to the corner connector, when the frame piece is in a connected condition.

12. The rack according to claim 1, wherein the corner connector comprises at least two separately formed parts which can be interconnected in a detachable manner.

13. The rack according to claim 12, wherein the at least two separately formed parts of the corner connector together enclose a cavity.

14. The rack according to claim 12, wherein the at least two separately formed parts of the corner connector can be interconnected in a detachable manner with the aid of the bracing unit of one of the frame pieces to be connected, the parts of the corner connector which are to be connected having receiving apertures, which are in alignment with one another, for the at least one tensioning element.

15. The rack according to claim 1, wherein at least one of the force transmission members is constructed integrally on the corner connector, which is to be braced.

* * * * *